(12) United States Patent
Huang et al.

(10) Patent No.: US 12,489,512 B2
(45) Date of Patent: Dec. 2, 2025

(54) ADAPTIVE ANTENNA DIVERSITY

(71) Applicant: MEDIATEK INC., Hsin-Chu (TW)

(72) Inventors: Che-Wei Huang, Hsinchu (TW);
Yu-Ming Wen, Hsinchu (TW);
Po-Hsun Huang, Hsinchu (TW);
Gui-Lin Chen, Hsinchu (TW);
Yen-Shuo Lu, Hsinchu (TW);
Ting-Che Tseng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 449 days.

(21) Appl. No.: 18/123,955

(22) Filed: Mar. 20, 2023

(65) Prior Publication Data
US 2023/0327743 A1 Oct. 12, 2023

Related U.S. Application Data

(60) Provisional application No. 63/323,556, filed on Mar. 25, 2022.

(51) Int. Cl.
| | |
|---|---|
| *H04B 17/21* | (2015.01) |
| *H04B 7/08* | (2006.01) |
| *H04B 17/20* | (2015.01) |
| *H04B 17/24* | (2015.01) |

(52) U.S. Cl.
CPC ......... *H04B 7/0808* (2013.01); *H04B 17/202* (2023.05); *H04B 17/21* (2015.01)

(58) Field of Classification Search
CPC ................................ H04B 17/20; H04L 12/28
USPC .................................. 370/329, 401, 402, 403
See application file for complete search history.

(56) References Cited

U.S. PATENT DOCUMENTS

| | | | |
|---|---|---|---|
| 6,362,737 B1 * | 3/2002 | Rodgers ............. | G08B 13/2417 340/10.2 |
| 2005/0107048 A1 | 5/2005 | Saunders | |
| 2012/0170685 A1 | 7/2012 | Cho | |
| 2013/0176878 A1 | 7/2013 | Lee | |
| 2017/0207530 A1 | 7/2017 | Anderson | |

FOREIGN PATENT DOCUMENTS

| | | |
|---|---|---|
| CN | 114221682 A | 3/2022 |
| TW | 202114366 A | 4/2021 |

* cited by examiner

*Primary Examiner* — Dang T Ton
(74) *Attorney, Agent, or Firm* — Winston Hsu

(57) ABSTRACT

The present invention provides a control method of an electronic device is disclosed, wherein the electronic device includes a first antenna and a second antenna. The control method includes the steps of: setting one of the first antenna and the second antenna as a default antenna; receiving a plurality of packets within an interval; for each of the plurality of packets, comparing a signal strength corresponding to the first antenna and a signal strength of the second antenna to generate a first comparison result; updating a first value or a second value according to the first comparison result; comparing the first value and the second value to generate a second comparison result when running out the interval; and selecting one of the first antenna and the second antenna to be the default antenna according to the second comparison result.

16 Claims, 6 Drawing Sheets

ADAPTIVE ANTENNA DIVERSITY

CROSS REFERENCE TO RELATED APPLICATIONS

This application claims the benefit of U.S. Provisional Application No. 63/323,556, filed on Mar. 25, 2022. The content of the application is incorporated herein by reference.

BACKGROUND

Multipath is a phenomenon that occurs when electromagnetic waves bounce of surfaces, and arrives at the receiver at different times. When these signals arrive at the receiver out-of-phase, they can result in a form of cancellation termed fading. Antenna diversity is a technique that can be used to improve radio communication and maximize the chance of a packet getting through at a given time and in a given position between a receiver and transmitter in a non-static environment.

In the conventional antenna diversity mechanism, when any packet received by the receiver of a current device, a physical layer of the receiver will detect signal strengths of two antennas in a legacy short training field (L-STF) of the packet, and an antenna with higher signal strength is selected to receive the following data. However, this antenna diversity mechanism may have several problems. A first problem is that the antenna selection is done in the L-STF of the packet, but at this time the receiver cannot recognize the packet that is unicast to me. For example, if the signal received by a first antenna has good quality, but there is a strong signal near a second antenna, the receiver will always select the second antenna for receiving the following data, even if this strong signal is not unicast to the receiver. A second problem is that a peer device may use inappropriate antenna information to transmit packet to a current device. For example, if the current device sent beamform information of the first antenna as the antenna information to the peer device, the peer device will use the antenna information corresponding to the first antenna as default antenna information. Therefore, if the current device switches to the second antenna, the receiver performance may be degraded because the peer device still uses the default antenna information for signal transmission. A third problem is that the performance may be degraded due to different loading of two antennas. Specifically, the antenna loading will affect the performance of the transmission signal, that is, the calibration data of the first antenna cannot be used for the second antenna.

SUMMARY

It is therefore an objective of the present invention to provide an antenna diversity device, which has a better antenna switching mechanism, to solve the above-mentioned problems.

According to one embodiment of the present invention, a control method of an electronic device is disclosed, wherein the electronic device comprises a first antenna and a second antenna. The control method comprises the steps of: setting one of the first antenna and the second antenna as a default antenna; receiving a plurality of packets within an interval; for each of the plurality of packets, comparing a signal strength corresponding to the first antenna and a signal strength of the second antenna to generate a first comparison result; in response to the first comparison result indicating that the signal strength corresponding to the first antenna is greater than or lower than the signal strength of the second antenna, increasing a first value or a second value; comparing the first value and the second value to generate a second comparison result when running out the interval; and selecting one of the first antenna and the second antenna to be the default antenna according to the second comparison result.

According to one embodiment of the present invention, an electronic device comprising a receiver and a control circuit is disclosed. The receiver is configured to set one of a first antenna and a second antenna as a default antenna, and receive a plurality of packets within an interval, wherein for each of the plurality of packets, the receiver compares a signal strength corresponding to the first antenna and a signal strength of the second antenna to generate a first comparison result; and in response to the first comparison result indicating that the signal strength corresponding to the first antenna is greater than or lower than the signal strength of the second antenna, the receiver increases a first value or a second value. The control circuit is coupled to the receiver, wherein the control circuit compares the first counter value and the second counter value to generate a second comparison result when running out the interval, and selects one of the first antenna and the second antenna to be the default antenna according to the second comparison result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
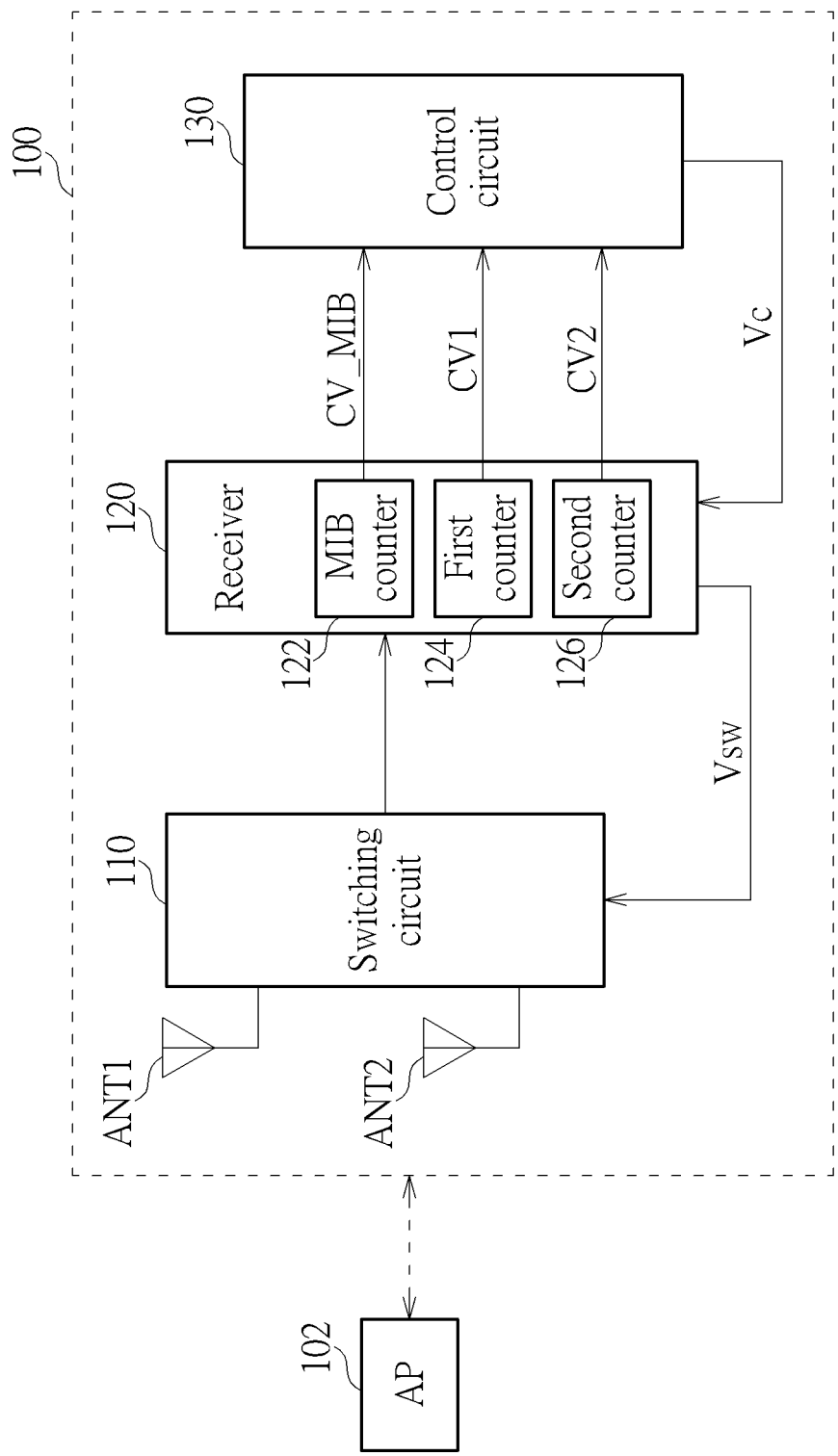
FIG. 1 is a diagram illustrating an electronic device according to one embodiment of the present invention.

FIG. 1 is a diagram illustrating an electronic device 100 according to one embodiment of the present invention, wherein the electronic device 100 is an antenna diversity device having a plurality of antennas (in this embodiment, two antennas ANT1 and ANT2 serve as the plurality of antennas). As shown in FIG. 1, the electronic device 100 comprises a switching circuit 110, a receiver 120 and a control circuit 130, wherein the receiver 120 comprises a management information counter (MIB) counter 122, a first counter 124 and a second counter 126. In this embodiment, the electronic device 100 can be any device having wireless communication mechanism such as a cellular phone, a pad, a tablet and a notebook. In addition, the receiver 120 may comprise a front-end circuit, a physical layer circuit and a media access control (MAC) layer circuit; and the control circuit 130 can be implemented by software or hardware.

Figure 2:
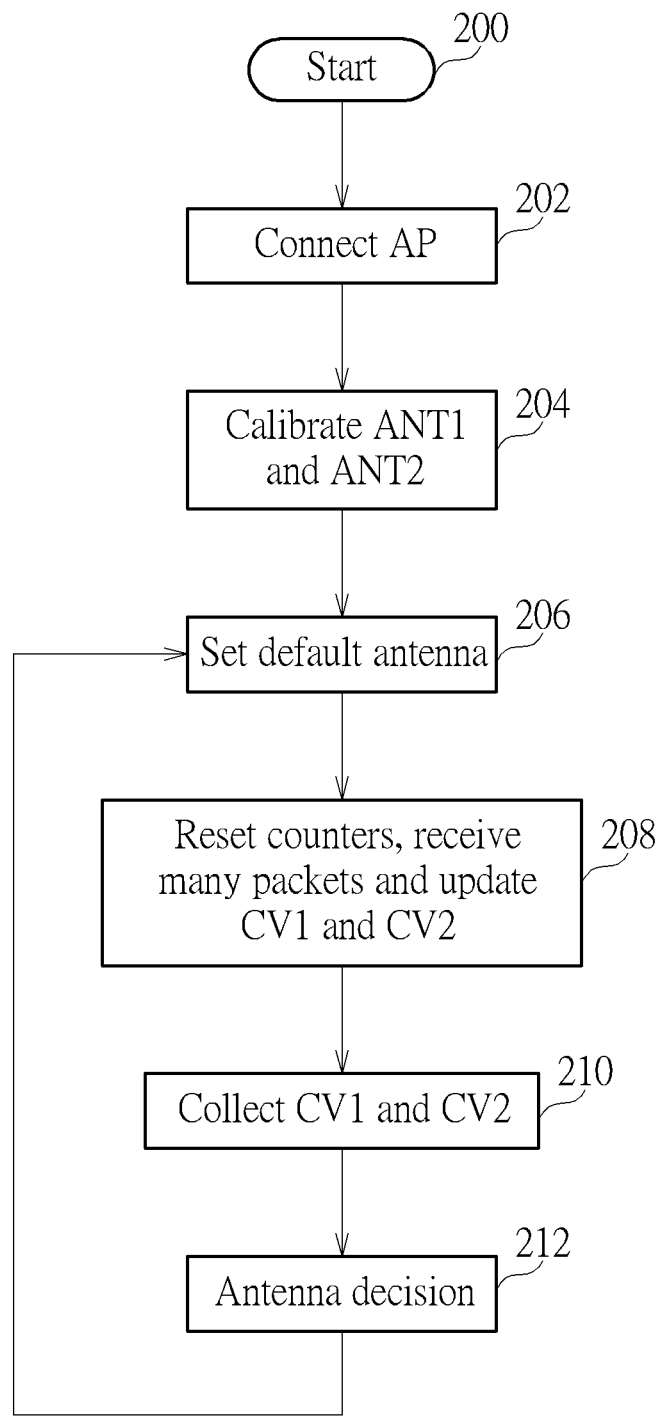
FIG. 2 is a flowchart of a control method of the electronic device according to one embodiment of the present invention.

FIG. 2 is a flowchart of a control method of the electronic device 100 according to one embodiment of the present invention. In Step 200, the flow starts, and the electronic device 100 is powered on and has initialized the internal circuits. In Step 202, the electronic device 100 starts to establish a link with an access point (AP) 102. During the period of establishing the link with the AP 102, the receiver 120 generates a switching signal Vsw to select one of the antennas ANT1 and ANT2, to obtain calibration data of the two antennas ANT1 and ANT2. Specifically, the receiver 120 can generate the switching signal Vsw to the switching circuit 110, so that the switching circuit 110 outputs a first signal received by the antenna ANT1 to the receiver 120, wherein the first signal may be a training signal or a calibration signal transmitted by the AP 102, or the first signal may be a signal provided by a transmitter of the electronic device 100. Meanwhile, the signal received by the antenna ANT2 may not enter the receiver 120. At this time, the receiver 120 performs a calibration step based on the received first signal to obtain the calibration data of the antenna ANT1, wherein the calibration data may comprise digital pre-distortion (DPD) calibration data, transmitter signal indicator strength (TSSI) differential nonlinearity (DNL) calibration data, etc. Then, after the calibration data of the antenna ANT1 is obtained, the receiver 120 can generate the switching signal Vsw to the switching circuit 110, so that the switching circuit 110 outputs a second signal received by the antenna ANT2 to the receiver 120, wherein the second signal may be the training signal or the calibration signal transmitted by the AP 102, or the second signal may be a signal provided by the transmitter of the electronic device 100. Meanwhile, the signal received by the antenna ANT1 may not enter the receiver 120. At this time, the receiver 120 performs a calibration step based on the received second signal to obtain the calibration data of the antenna ANT2, wherein the calibration data may comprise DPD calibration data, TSSI DNL calibration data, etc.

The calibration data of the antennas ANT1 and ANT2 are stored in the registers within the receiver 120 for further use.

In light of above, by calibrating the two antennas ANT1 and ANT2 when the electronic device 100 establishes a link with the AP 102, or by calibrating the two antennas ANT1 and ANT2 after the electronic device 100 establishes the link with the AP 102, the receiver 120 can store the calibration data of the two antennas ANT1 and ANT2. Therefore, in the subsequent operation of the electronic device 100, no matter which one of the antennas ANT1 and ANT2 is used, the receiver 120 can always use the suitable calibration data to calibrate the received signal. That is, if the antenna ANT1 is selected, the calibration data of the antenna ANT1 is used by the receiver 120; and if the antenna ANT2 is selected, the calibration data of the antenna ANT2 is used by the receiver 120.

In Step 206, the receiver 120 generates the switching signal Vsw to select one of the antennas ANT1 and ANT2 to serve as a default antenna. In this embodiment, initially the antenna ANT1 serves as the default antenna.

Figure 3:
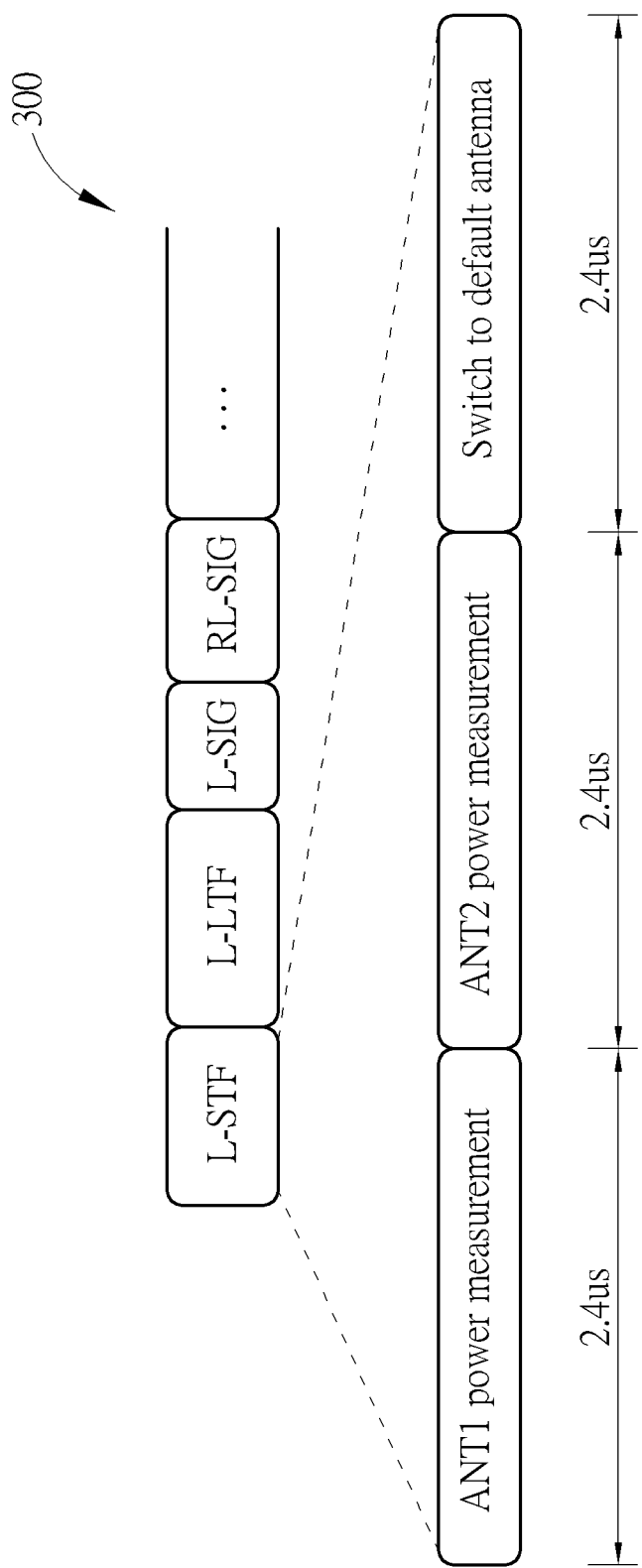
FIG. 3 shows a packet and power detection according to one embodiment of the present invention

In Step 208, the receiver 120 resets the first counter 124 and the second counter 126, and the first counter 124 and the second counter 126 start to work. Then, the receiver 120 receives packets from the default antenna, and starts to determine which one of the antennas ANT1 and ANT2 receives the signal with higher power/strength. FIG. 3 shows a packet 300 according to one embodiment of the present invention, wherein the packet 300 comprises a legacy short training field (L-STF), a legacy long training field (L-LTF), a legacy signal field (L-SIG), a repeated L-SIG (RL-SIG), . . . etc., and the receiver 120 can detect signal strengths corresponding to the antennas ANT1 and ANT2 in the L-STF. Specifically, in a first period (e.g., 2.4 us) of the L-STF, the receiver 120 generates the switching signal Vsw to the switching circuit 110 to select the antenna ANT1, so that the switching circuit 110 outputs the first signal received by the antenna ANT1 to the receiver 120, and the receiver 120 detects a power of the first signal to obtain a received signal strength indicator (RSSI) corresponding to the antenna ANT1.

Then, in a second period (e.g., 2.4 us) following the first period of the L-STF, the receiver 120 generates the switching signal Vsw to the switching circuit 110 to select the antenna ANT2, so that the switching circuit 110 outputs the second signal received by the antenna ANT1 to the receiver 120, and the receiver 120 detects a power of the second signal to obtain a RSSI corresponding to the antenna ANT2. Then, in a third period (e.g., 2.4 us) following the second period of the L-STF, the receiver 120 compares the RSSIs corresponding to the antennas obtained in the first period and the second period to generate a comparison result, and the receiver 120 updates a first value (hereinafter, a first counter value) CV1 of the first counter 124 or a second value (hereinafter, a second counter value) CV2 of the second counter 126 according to the comparison result. Specifically, if the comparison result indicates that the RSSI corresponding to the antenna ANT1 is greater than the RSSI corresponding to the antenna ANT2, the receiver 120 controls the first counter 124 to update the counter value CV1 (e.g., increment the counter value CV1 by one), and at this time, the counter value CV2 of the second counter 126 is not updated. In addition, if the comparison result indicates that the RSSI corresponding to the antenna ANT1 is less than the RSSI corresponding to the antenna ANT2, the receiver 120 controls the second counter 126 to update the counter value CV2 (e.g., increment the counter value CV2 by one), and at this time, the counter value CV1 of the first counter 124 is not updated.

In one embodiment, the receiver 120 or the control circuit 130 can set an interval (hereinafter, a count interval) shown in FIG. 4, and the count interval is used to accumulate the counter values CV1 and CV2, and the receiver 120 always use the same antenna to receive the fields following the L-STF of each packet. That is, in the count interval between time to and time t1, for each packet, the receiver 120 will use the antenna ANT1 to receive all other fields except for the L-STF. In one embodiment, the receiver 120 may receive a plurality of packets within the count interval, for example, the count interval may be 200 millisecond (ms), and the receiver 120 may receive fifty to one-hundred packets within one count interval.

In Step 210, after reaching the end of the count interval (i.e., running out the count interval, time t1), the control circuit 130 collects the counter value CV1 and the counter value CV2. In Step 212, the control circuit 130 compares the counter value CV1 and the counter value CV2 to generate a comparison result. In this embodiment, the control circuit 130 determines if updating the default antenna according to the comparison result. Specifically, if the counter value CV1 is greater than the counter value CV2, its means that the antenna ANT1 has better signal strength on average, so the control circuit 130 generates a control signal Vc to the receiver 120 to notify this information, for the receiver 120 still setting the antenna ANT1 as the default antenna. In addition, if the counter value CV2 is greater than the counter value CV1, its means that the antenna ANT2 has better signal strength on average, so the control circuit 130 generates the control signal Vc to the receiver 120 to notify this information, for the receiver 120 to set the antenna ANT2 as the default antenna.

After the Step 212 is performed, the flow goes back to Step 206 to set the default antenna. In the embodiment shown in FIG. 4, the comparison result indicates that the counter value CV2 is greater than the counter value CV1, so the receiver 120 sets the antenna ANT2 as the default antenna.

During the count interval between time t1 and time t2, the receiver 120 will use the antenna ANT2 to receive all other fields except for a portion of the L-STF of each packet, and the receiver 120 detects RSSIs of two antennas ANT1 and ANT2 within the L-STF of each packet, for updating the counter values CV1 and CV2. Then, after reaching the time t2, the control circuit 130 collects the counter value CV1 and the counter value CV2, and compares the counter value CV1 and the counter value CV2 to generate a comparison result. In this embodiment, when an end of the count interval is reached, because the comparison result indicates that the counter value CV2 is greater than the counter value CV1, so the receiver 120 still sets the antenna ANT2 as the default antenna.

Figure 4:
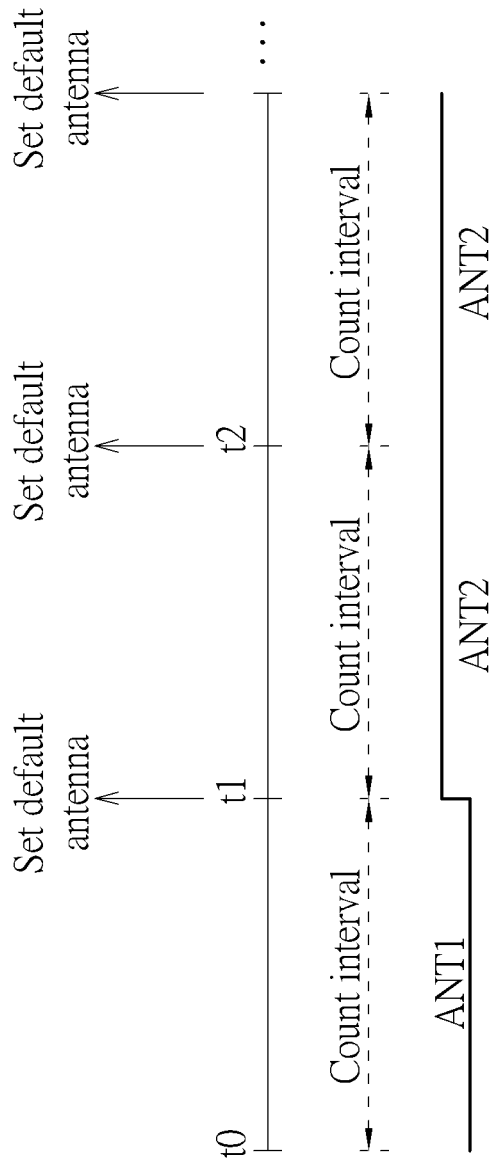
FIG. 4 shows a count interval for setting the default antenna according to one embodiment of the present invention.

In the embodiment shown in FIG. 2-FIG. 4, by setting the count interval and using the default antenna to receive all other fields except for a portion of the L-STF of the packets in the count interval, the antennas are not switched too often, and overall the receiver 120 can receive better signals.

Figure 5:
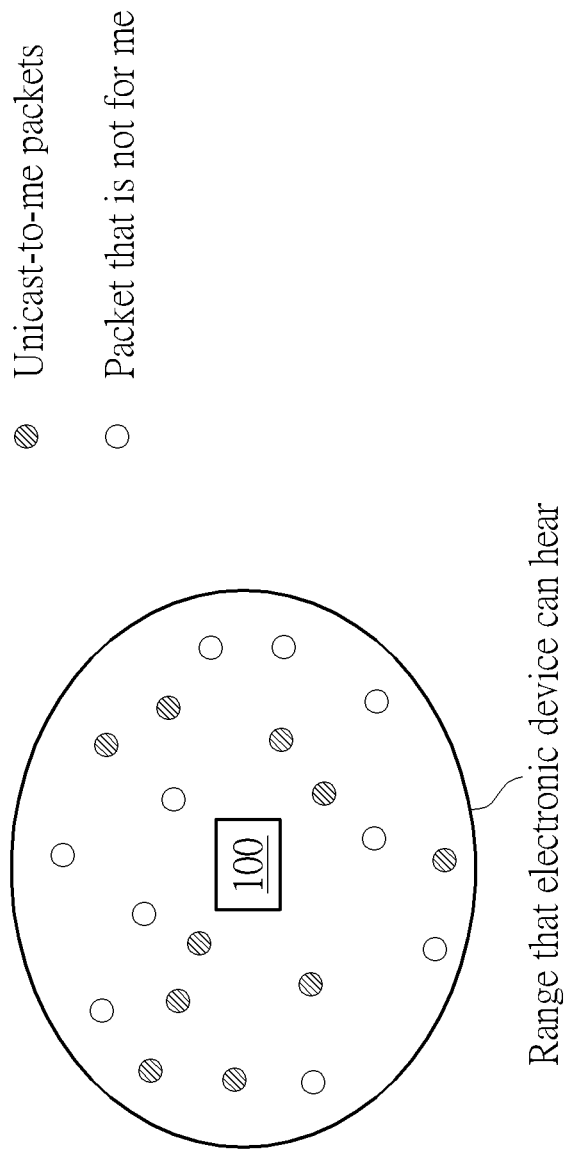
FIG. 5 shows unicast-to-me packets and packets not for the electronic device.

In addition, in the Step 208, because the signal strength detection is for all the received packets, the counter value CV1 and the counter value CV2 may not reflect real powers of the packets that the receiver 120 needs to receive. Taking FIG. 5 as an example, within a range that the electronic device 100 can hear, the packets received by the electronic device 100 comprise unicast-to-me packets and packets that are not for the electronic device 100. If a certain number of the packets of the electronic device 100 are not for the electronic device 100, it means that the counts value CV1 and CV2 have no reference value. Therefore, the MIB counter 122 is provided to record the number of the unicast-to-me packets, for determining if updating the default antenna according to the counter values CV1 and CV2. That is, in an alternative embodiment, in Step 208, the receiver 120 further resets the MIB counter 122, and for each packet that has been detected to obtain the RSSIs corresponding the antennas ANT1 and ANT2, the receiver 120 further analyzes the content of each packet to determine if the received packet is the unicast-to-me packet. If the received packet is the unicast-to-me packet, the receiver 120 controls the MIB counter 122 to update a counter value CV_MIB (e.g., increment the counter value CV_MIB by one); and if the received packet is not the unicast-to-me packet, the receiver 120 the counter value CV_MIB is not updated. In one embodiment, the receiver 120 can analyzes a preamble or a header of the packet to determine if the packet is the unicast-to-me packet. For example, if the packet comprises a MAC address of the electronic device 100, or the packet belongs to a basic service set (BSS) including the electronic device 100, this packet can serve as the unicast-to-me packet.

Figure 6:
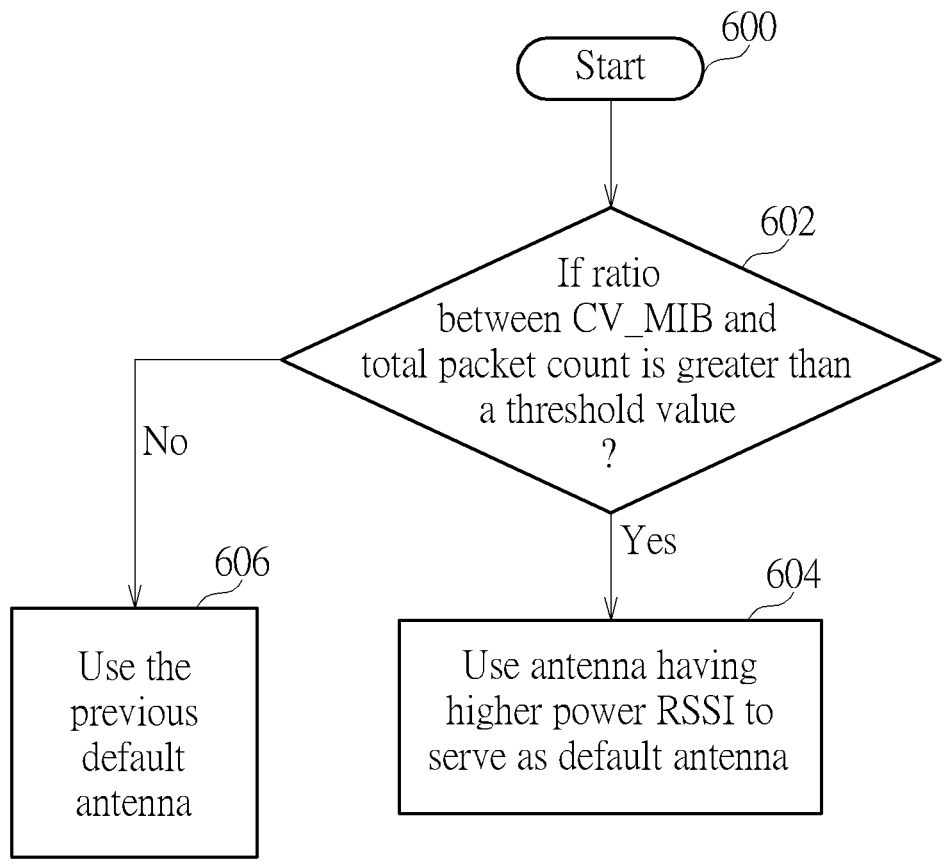
FIG. 6 is a flowchart of a control method of the electronic device according to one embodiment of the present invention.

FIG. 6 is a flowchart of a control method according to one embodiment of the present invention, wherein the flow shown in FIG. 6 may correspond to the operations of Step 212 and Step 206 shown in FIG. 2. In Step 600, the flow starts. In Step 602, after reaching the count interval, the control circuit 130 determines if a ratio between the counter value CV_MIB and a total packet count is greater than a threshold value such as 60%, if yes, the flow enters Step 604 to use the antenna corresponding to greater counter value as the default antenna; and if not, the flow enters Step 606 to use the previous default antenna. In this embodiment, the total packet count can be a sum of the counter values CV1 and CV2. Taking FIG. 4 as an example, in time t0, assuming that the counter value CV2 is greater than the counter value CV1, if a ratio between the counter value CV_MIB and the total packet count is greater than the threshold value such as 60%, the control circuit 130 controls the receiver 120 to use the antenna ANT2 as the default antenna for the next count interval; and if a ratio between the counter value CV_MIB and the total packet count is not greater than the threshold value, the control circuit 130 directly controls the receiver 120 to use the antenna ANT1 as the default antenna again for the next count interval.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an electronic device, wherein the electronic device comprises a first antenna and a second antenna, and the control method comprises:
    setting one of the first antenna and the second antenna as a default antenna;
    receiving a plurality of packets within an interval;
    for each of the plurality of packets, comparing a signal strength corresponding to the first antenna and a signal strength of the second antenna to generate a first comparison result;
    in response to the first comparison result indicating that the signal strength corresponding to the first antenna is greater than or lower than the signal strength of the second antenna, increasing a first value or a second value;
    comparing the first value and the second value to generate a second comparison result when running out the interval; and
    selecting one of the first antenna and the second antenna to be the default antenna according to the second comparison result.

2. The control method of claim 1, wherein the step of for each of the plurality of packets, comparing the signal strength corresponding to the first antenna and the signal strength of the second antenna to generate a first comparison result comprises:
    using the first antenna to receive a first signal to determine the signal strength corresponding to the first antenna within a specific field of the packet, wherein the first signal corresponds to a first period of the specific field;

using the second antenna to receive a second signal to determine the signal strength corresponding to the second antenna within the specific field of the packet, wherein the second signal corresponds to a second period of the specific field; and comparing the signal strength corresponding to the first antenna and the signal strength of the second antenna to generate the first comparison result within the specific field.

3. The control method of claim 2, wherein the step of receiving the plurality of packets within the interval comprises:

for each of the plurality of packets, using the default antenna to receive all other fields except for a portion of the specific field of the packet.

4. The control method of claim 1, further comprising:

for each of the plurality of packets, determining whether the packet is a unicast-to-me packet; and in response to the packet being the unicast-to-me packet, increasing a management information base (MIB) value.

5. The control method of claim 4, further comprising:

when running out the interval, determining whether a ratio of the MIB value and a total packet count is greater than a threshold value.

6. The control method of claim 5, wherein the step of determining or updating the default antenna from the first antenna and the second antenna according to the second comparison result comprises:

if the ratio is greater than the threshold value, determining or updating the default antenna from the first antenna and the second antenna according to the second comparison result; and if the ratio is not greater than the threshold value, not updating the default antenna, and directly using the default antenna for a following interval.

7. The control method of claim 1, further comprising:

establishing a link with an access point;

receiving a first signal from the first antenna;

performing a calibration step based on the first signal to obtain calibration data of the first antenna;

receiving a second signal from the second antenna; and performing the calibration step based on the second signal to obtain calibration data of the second antenna.

8. The control method of claim 7, wherein the step of performing the calibration step based on the first signal to obtain the calibration data of the first antenna, and the step of performing the calibration step based on the second signal to obtain the calibration data of the second antenna are executed when the electronic device 100 establishes the link with the access point.

9. An electronic device, comprising:

a receiver, configured to set one of a first antenna and a second antenna as a default antenna, and receive a plurality of packets within an interval, wherein for each of the plurality of packets, the receiver compares a signal strength corresponding to the first antenna and a signal strength of the second antenna to generate a first comparison result; and in response to the first comparison result indicating that the signal strength corresponding to the first antenna is greater than or lower than the signal strength of the second antenna, the receiver increases a first value or a second value; and a control circuit, coupled to the receiver, wherein the control circuit compares the first value and the second value to generate a second comparison result when running out the interval, and selects one of the first antenna and the second antenna to be the default antenna according to the second comparison result.

10. The electronic device of claim 9, wherein the receiver uses the first antenna to receive a first signal to determine the signal strength corresponding to the first antenna within a specific field of the packet, wherein the first signal corresponds to a first period of the specific field; the receiver uses the second antenna to receive a second signal to determine the signal strength corresponding to the second antenna within the specific field of the packet, wherein the second signal corresponds to a second period of the specific field; and the receiver compares the signal strength corresponding to the first antenna and the signal strength of the second antenna to generate the first comparison result within the specific field.

11. The electronic device of claim 10, wherein for each of the plurality of packets, the receiver uses the default antenna to receive all other fields except for a portion of the specific field of the packet.

12. The electronic device of claim 9, wherein for each of the plurality of packets, the receiver determines whether the packet is a unicast-to-me packet; and in response to the packet being the unicast-to-me packet, the receiver increases a management information base (MIB) value.

13. The electronic device of claim 12, wherein when running out the interval, the control circuit determines whether a ratio of the MIB value and a total packet count is greater than a threshold value.

14. The electronic device of claim 13, wherein if the ratio is greater than the threshold value, determining or updating the default antenna from the first antenna and the second antenna according to the second comparison result; and if the ratio is not greater than the threshold value, not updating the default antenna, and directly using the default antenna for a following interval.

15. The electronic device of claim 9, wherein the receiver further performs the steps of:

establishing a link with an access point;

receiving a first signal from the first antenna;

performing a calibration step based on the first signal to obtain calibration data of the first antenna;

receiving a second signal from the second antenna; and performing the calibration step based on the second signal to obtain calibration data of the second antenna.

16. The electronic device of claim 15, wherein the step of performing the calibration step based on the first signal to obtain the calibration data of the first antenna, and the step of performing the calibration step based on the second signal to obtain the calibration data of the second antenna are executed when the electronic device 100 establishes the link with the access point.

* * * * *